(12) United States Patent
Winkler (10) Patent No.: US 9,550,632 B2
(45) Date of Patent: Jan. 24, 2017

(54) DIVERTING DEVICE FOR DIVERTING CONTAINERS

(71) Applicant: KRONES AG, Neutraubling (DE)

(72) Inventor: Günter Winkler, Zell (DE)

(73) Assignee: KRONES AG, Neutraubling (DE)

(*) Notice: Subject to any disclaimer, the term of this patent is extended or adjusted under 35 U.S.C. 154(b) by 0 days.

(21) Appl. No.: 15/025,387

(22) PCT Filed: Sep. 23, 2014

(86) PCT No.: PCT/EP2014/070170
§ 371 (c)(1),
(2) Date: Mar. 28, 2016

(87) PCT Pub. No.: WO2015/055386
PCT Pub. Date: Apr. 23, 2015

(65) Prior Publication Data
US 2016/0236875 A1  Aug. 18, 2016

(30) Foreign Application Priority Data

Oct. 14, 2013  (DE) .................. 10 2013 220 682

(51) Int. Cl.
*B65G 47/82* (2006.01)
*B65G 47/84* (2006.01)
*B65G 47/71* (2006.01)

(52) U.S. Cl.
CPC .............. *B65G 47/82* (2013.01); *B65G 47/71* (2013.01); *B65G 47/845* (2013.01); *B65G 2201/0244* (2013.01)

(58) Field of Classification Search
CPC ....... B65G 47/82; B65G 47/845; B65G 47/71; B65G 2201/0244
(Continued)

(56) References Cited

U.S. PATENT DOCUMENTS 3,791,518 A    2/1974  Vanderhoof
3,955,678 A *  5/1976  Moyer .................. B65G 47/50
                                                198/370.07
(Continued)

FOREIGN PATENT DOCUMENTS

DE    2129914 A1    12/1971
DE    2917286 A1    11/1980
(Continued)

OTHER PUBLICATIONS

International Search Report for Application No. PCT/EP2014/070170, mailed Jan. 26, 2015.
(Continued)

*Primary Examiner* — Gene Crawford
*Assistant Examiner* — Keith R Campbell
(74) *Attorney, Agent, or Firm* — Marshall, Gerstein & Borun LLP (57) ABSTRACT

Diverting device for diverting containers, for example bottles, from a transport path, the diverting device including a stationary frame that is disposed next to the transport path and in which at least two movably formed diverting segments are disposed perpendicularly to the central axis of the transport path, the diverting segments being suitable to divert a container from the transport path. Each of the diverting segments includes a diverting surface that is parallel to the transport direction of the containers in the transport path and that can come in contact with a container to be diverted.

14 Claims, 4 Drawing Sheets

(58) Field of Classification Search
USPC .......................................... 198/370.07, 436
See application file for complete search history.

(56) References Cited

U.S. PATENT DOCUMENTS

| | | | |
|---|---|---|---|
| 4,321,994 A | 3/1982 | Heuft | |
| 4,369,873 A | 1/1983 | Heuft | |
| 4,442,932 A * | 4/1984 | Sashiki | G01G 19/393 177/25.18 |
| 4,476,981 A | 10/1984 | Yoshida | |
| 4,986,407 A * | 1/1991 | Heuft | B65G 47/766 198/367 |
| 6,755,298 B1 * | 6/2004 | Heuft | B07C 5/122 198/370.07 |
| 7,410,045 B2 * | 8/2008 | Patterson | B65G 47/845 198/370.07 |
| 7,886,891 B2 * | 2/2011 | Ranger | B65G 47/82 198/370.01 |
| 9,272,850 B2 * | 3/2016 | Goudy | B65G 47/71 |
| 2003/0155285 A1 * | 8/2003 | Heitzer | B07C 5/362 209/653 |

FOREIGN PATENT DOCUMENTS

| | | |
|---|---|---|
| DE | 3215800 A1 | 11/1982 |
| DE | 3711605 A1 | 10/1988 |
| DE | 19516403 A1 | 11/1995 |
| DE | 102010025744 A1 | 1/2012 |
| DE | 102010062830 A1 | 6/2012 |
| EP | 0003111 B1 | 6/1982 |
| EP | 1012087 B1 | 12/2002 |
| EP | 2594513 A1 | 5/2013 |
| WO | WO-03022717 A1 | 3/2003 |

OTHER PUBLICATIONS

German Search Report for Application No. 102013220682.8, mailed May 20, 2014.

* cited by examiner

DIVERTING DEVICE FOR DIVERTING CONTAINERS

CROSS-REFERENCE TO RELATED APPLICATION

The present application is the US national phase of International Patent Application No. PCT/EP2014/070170, filed Sep. 23, 2014, which application claims priority to German Application No. 102013220682.8, filed Oct. 14, 2013. The priority application, DE 102013220682.8, is hereby incorporated by reference.

FIELD OF THE INVENTION

The present invention relates to a diverting device for diverting containers that comprises several diverting segments.

STATE OF THE ART

Diverting devices for diverting containers, for example bottles, from transport paths are in principle known from the state of the art. The EP 1 012 087 B1 discloses a movable sledge that is disposed next to a transport path. This sledge is moved with the same speed as the container to be diverted and further comprises several diverting segments that are extended transversally to the transport direction and that can divert the container.

The DE 10 2010 025 744 A1 further discloses actuators that are disposed next to the conveyor belt and that jointly form a conveyor curve that can transport a container successively from the standard transport path for example onto a diverting path. Therefore, a curved diverting curve is formed by the individual contact surfaces of the actuators, which can influence the movement of an arriving container in a way that the container is deflected onto the diverting path. However, considerable braking effects occur in this process due to the curve that is formed by the stationary diverting segments ahead of and next to the container, whereby the containers can tip over, in particular due to the containers being accelerated once again after the contact with the diverting segments.

PURPOSE

Based on the state of the art, the purpose of the invention consists of providing a diverting device for diverting containers, whereby the attainable transport speeds of the containers at which a reliable diverting process is still possible should be significantly higher than in known diverting devices.

SOLUTION

The diverting device for diverting containers, for example bottles, from a transport path according to the invention is characterized in that the diverting segments comprise a diverting surface that is disposed in parallel to the transport direction of the containers and that can come in contact with a container to be diverted. The diverting device provided in this way allows for diverting of recipients from the transport path with a significantly higher speed as no and/or only a negligible braking of the containers in the transport direction occurs during the diverting process and consequently the likeliness of containers tipping over is reduced.

In an embodiment, each diverting segment can be activated separately. Therefore, each diverting process and the movement of each diverting segment can be activated, whereby the possible diverting processes become much more flexible compared to the state of the art. The diverting device can therefore provide different diverting processes for the same container type in which containers are moved for example with different speeds or over different distances, whereby the diverting device can also be adapted for different container types.

Further, provision can be made that a diverting path of a container in a perpendicular position to the transport path can be adjusted through control of the movement profile of each diverting segment. Therefore, both the speed at which a container is diverted as well as the overall diverting path, for example whether the container is diverted onto the next or the next but one transport path can be controlled through appropriate activation of the diverting elements.

In a further development of the invention, the diverting device comprises at least 15, 20, 25 or 30 diverting segments. The use of a plurality of diverting segments allows for a substantially finer successive categorization of the diverting processes that are achieved with every single diverting segment and still enables, for example if only a single diverting device is provided, diverting of multiple containers at the same time.

Due to the multiple diverting segments, also containers from a flow of containers that are transported directly behind each other or at a close distance to each other can be diverted individually and independently of the containers ahead of them or behind them if it is ensured that the segments are always and/or will always be retracted for bottles that should not be diverted and are and/or will be extended only in the area of the bottles to be diverted (that moves along). Due to the parallel alignment of the diverting surfaces, the containers can be diverted in the same way as by an individual slider that is moved perpendicularly to the transport direction while the distance that the container travels in the transport direction during the diverting process can, however, be longer than the container division in the transport direction (given due to the container expansion in the transport direction and potential spacing of the containers in the transport direction).

According to an embodiment, the diverting device is characterized in that the diverting surface has a lower friction coefficient than the transport path. Therefore, even containers that are transported with very high transport speeds (up to 4 m/s) can be transported without the risk of tipping over because the containers are hardly hampered in their movement along the transport path due to the low friction coefficient and are only exposed to one force that acts perpendicularly to the transport path due to the movement of the diverting elements themselves in this direction.

Furthermore, the diverting device can comprise N diverting segments and a control unit can be provided that can deflect the diverting segments in the transport direction of a container to be diverted successively and over a part of the overall diverting path A so that a container can be diverted through successive diverting, whereby the part of the diverting path A is provided by $$a = \frac{A}{N}$$

and whereby the n-th (n≤N) diverting segment can be extended over the distance l=a+a(n−1) or whereby each diverting segment can deflect a container over a path section that differs at least from the path section of another diverting segment, whereby the sum of the path sections is equal to the overall diverting path A. The higher the number of diverting segments used, the smaller can this division be. Here, the advantage consists in that a container is not only diverted by means of one diverting segment but by means of several diverting segments, whereby the diverting movement transversally to the transport path occurs during a longer period of time, which reduces the risk of tipping over because of too strong impacting accelerations.

In a further development of this embodiment, at least one part of the diverting segments disposed in the transport direction ahead of the container to be diverted can be extended at the same time over a distance s that is equal to the distance of a container to be diverted, which is transported on the transport path, from the diverting segments and in which the diverting segments in the transport direction can be extended successively by the distance b=am. This way, all diverting segments can be guided as closely as possible towards the container to be diverted already prior to the start of the diverting processes, which reduces the amplitude of the remaining movement for diverting for each diverting segment at least by the distance s so that the remaining movement of the diverting segments can occur with a lower speed, which reduces the risk of tipping over of a container to be diverted once again.

In an embodiment, the diverting device is characterized in that a first number of diverting segments is disposed ahead of a second number of diverting segments in the transport direction and that the first number comprises at least the first diverting segment (used in the diverting process) in the transport direction and the second number comprises at least the last diverting segment (used in the diverting process) in the transport direction, whereby the first number of transport segments can respectively divert a container by a distance smaller than a and the second number of diverting segments can respectively divert a container by a distance greater than a, whereby $$a = \frac{A}{N},$$

with A as the overall length of the diverting distance and N the number of the diverting segments. This way, a container can initially be diverted gradually out of its original movement path and subsequently be diverted to an increasingly greater extent.

In one direction that is perpendicular to the surface of the transport path, the diverting surfaces can be straight or curved. When the diverting surfaces are straight, the diverting surfaces are parallel to the transport direction and parallel to the direction that is perpendicular to the surface of the transport path. When they are curved, they can for example have the form of a handrail or a horizontal thrust profile, of which, however, several are preferably to be provided in order to act at the same time at several heights of a container for diverting.

Using for example one of these devices, a method for diverting of containers such as bottles from a transport path can be implemented, which is characterized in that the diverting segments touch the container to be diverted during diverting with a diverting surface that is disposed in parallel to the transport path and divert the container. With this method, a diverting process can be implemented that can also applied for containers that are transported along the transport track with a substantially higher speed than up to present and that can be used flexibly with regard to the track onto which a container is diverted.

In an embodiment, the movement of the diverting segments is controlled separately. Due to the separate control of each diverting segment, the diverting process can on one hand be controlled individually and, on the other hand, changed conditions during the diverting process, e.g. reeling of the container, can be taken into consideration, whereby the overall process can be optimized with regard to its reliability. Furthermore, containers that are positioned ahead of or behind the containers to be diverted cannot be diverted (individually as well) or diverted (individually as well) due to the individual control.

According to a further embodiment, the method is characterized in that a diverting path of a container to be diverted that is perpendicular to the transport path is determined through control of the movement profile of the diverting segments. This way, not only the distance by which a container is to be diverted can be controlled, but also the speed of this process and/or the momentum transmission or the force transmission during the diverting process.

Furthermore, the method can comprise that N diverting segments are controlled by a control unit in a way that the diverting segments are deflected subsequently over a part of the overall diverting path A in the transport direction of a container to be diverted, whereby the part of the diverting path A is provided through $$a = \frac{A}{N}$$

and whereby the n-th diverting segment is moved in the transport direction over the path l=a+a(n−1), whereby a container is diverted successively over parts $$a = \frac{A}{N}$$

of the diverting path until the container will have been diverted over the overall diverting path A, or each diverting segment diverts the container by a path section that is different from at least one further diverting segment, whereby the sum of the path sections is equal to the overall diverting path A. This successive diverting process by means of multiple diverting segments is increasingly refined (while a division of the diverting path into equal parts $\bar{a}$ is maintained) the higher the number of the diverting segments $\bar{N}$>N used and always reduces the forces/accelerations transmitted to the container by the diverting segments.

Provision can be made for at least a part of the diverting segments, which is disposed ahead of the container to be diverted in the transport direction, to be moved over the path s that is equal to the distance of the container that is to be diverted on the conveyor belt to the diverting segments, whereby the diverting segments will subsequently be extended in the diverting direction by the path b=am and successively divert the container. Therefore, the diverting segments will be moved as closely as possible to the container prior to the start of the diverting process so that the remaining movement amplitudes are smaller for the diverting segments, whereby it will be easier in terms of control to move the diverting segments to the containers prior to the start of the diverting movement in a way that only a low momentum transmission will take place and/or a relatively low force will impact on the container whereby the risk of containers tipping over during the approach of the diverting segments is reduced significantly.

According to an embodiment, the movement of the diverting segments perpendicular to the transport path is described by a function $x=1\cdot\sin(ct)$ or any other function $x_{a, b, \ldots}(t)$, whereby t is the time and a, b, c are random real numbers greater than zero. A movement according to a sine function can be implemented easily in terms of control electronics and is characterized by the condition that in the point in which the container is touched, the speed of the diverting segment is as low as possible which is why the container is only impacted by a low force transmission during the displacement in a transversal direction to the transport path and consequently the risk of tipping over is reduced. The adaptation of the movement profile of the diverting segments to any functions, however, can be advantageous with regard to a specific movement profile to be achieved of the containers to be diverted.

In one embodiment, the speed at which the diverting segment is moved in the direction of the container to be diverted and moved away from said container is higher than the speed at which the diverting segment is moved while the diverting surface of the diverting segment is standing in contact with the container to be diverted. Similar to the described sine curve, relevant speed profiles of the diverting segments significantly reduce the risk of tipping over of the container due to a too strong momentum transmission, making the overall diverting process more reliable.

BRIEF DESCRIPTION OF THE FIGURES

FIG. 3a-1 is a displacement-over-time plot;

FIG. 3a-2 is a velocity-over-time plot;

FIG. 3b-1 is a displacement-over-time plot of a diverting system and process having a different diverting profile than that depicted in the plots of FIGS. 3a-1 and 3a-2.

FIG. 3b-2 is a velocity-over-time plot; and

DETAILED DESCRIPTION

Figure 1:
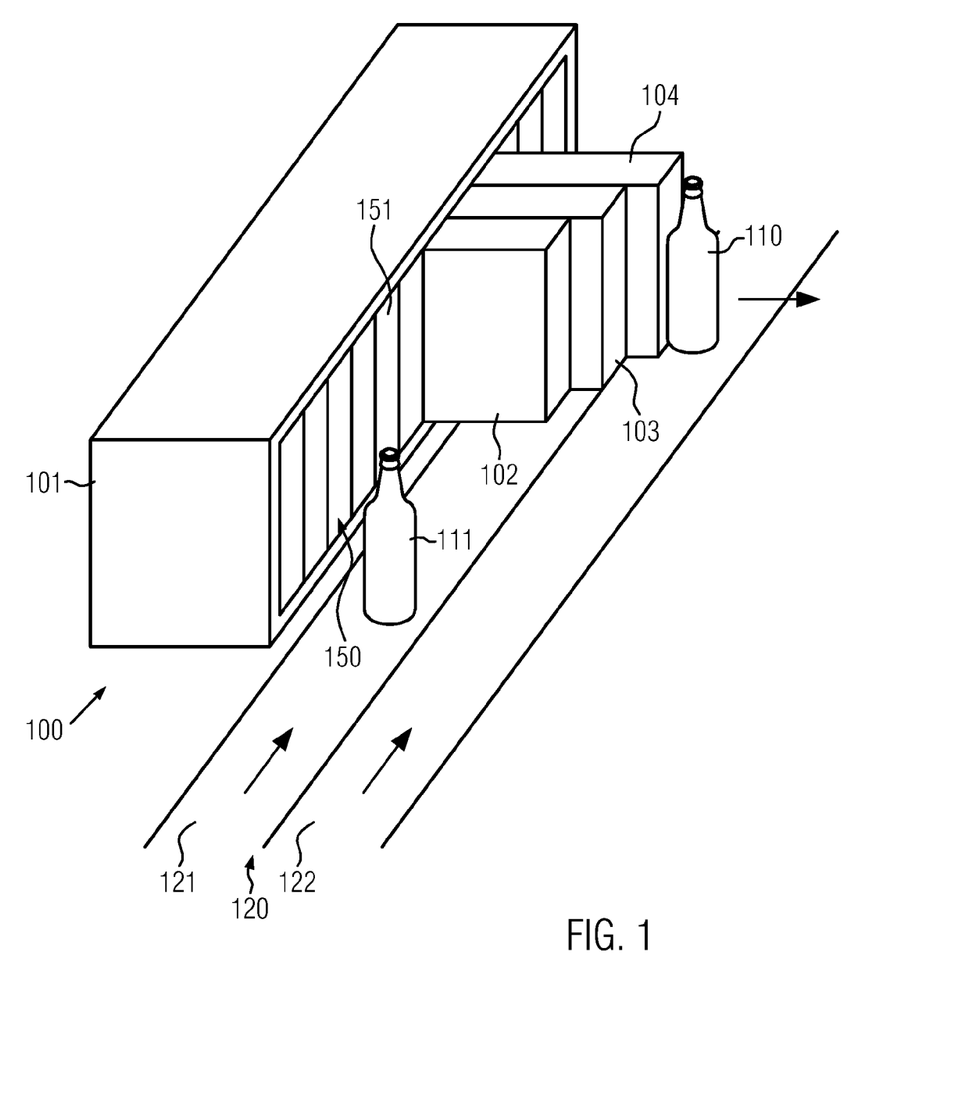
FIG. 1 is a perspective view of a diverting device according to the invention in accordance with an embodiment of the present disclose.

FIG. 1 shows a diverting device 100 according to the invention that is disposed directly next to a transport path 120. Here, the transport path is a linear conveyor, whereby the linear conveyor is divided into two different conveyors 121 and 122. The diverting device 100 is though not limited to applications in such transport paths. Rather, the diverting device 100 can also be used on much more extensive transport paths with a plurality (more than two, five or ten) of individual transport tracks 121 and 122 etc. or there can also be only one transport track on which there is space to arrange multiple containers next to each other in the transport direction. In the latter case, multiple transport paths are to be provided next to each other on a conveyor belt.

In this embodiment, the diverting device 100 comprises a frame 101. According to the invention, the diverting segments 150 are contained in this frame. The number of diverting segments is in principle a random number but amounts to a minimum of two. In addition, any numbers of diverting segments can be provided for. As, however, the overall arrangement should not occupy an unlimited amount of space while diverting of containers should be as reliable as possible, 12 to 20, preferably 16 diverting segments are to be installed. Depending on how far containers should be diverted, a smaller number of diverting segments, for example 5 or 10, can also be sufficient. Of course, this will only be the case if the diverting segments divert a container always by the path Δ in relation to the previous diverting segment. In principle, however, the path by which an individual diverting segment diverts a container can be of any length so that a desired diverting path A can also be implemented with a smaller number of diverting segments. However, the use of many diverting segments comes with the advantage that collisions of containers being transported in the transport path with diverting segments that are still extended and that have diverted another container but not yet been retracted back to their starting position can be avoided.

The fundamental working principle of the diverting device 100 consists in that the diverting device 100 is arranged in a stationary way next to the transport path and that the diverting segments have an even surface in a way that each diverting segment, which is driven for example by a position-controlled engine, has for itself a diverting surface 151 that is not curved in the transport direction. The diverting segments 102-104 are used for diverting a container in FIG. 1. For this purpose, the diverting segments can be driven out of the frame 101 of the diverting device 100 in the direction of the transport path but perpendicularly to the movement direction of the conveyed containers 110 and 111. In this process, they will come in contact with the external wall of a container 110 if they are extended sufficiently. Due to the even diverting surface 151 that is disposed in parallel to the transport direction of the containers, a force transmission onto the container 110 is enabled in a way that it is impacted by a force, essentially perpendicularly to the transport direction. Therefore, the container 110 can be diverted from the first transport path 121 onto the second transport path 122. Through the diverting surface 151 of each diverting segment and their arrangement in parallel to the transport direction of the container, it can be achieved that the overall force that is transmitted from one diverting segment 103 and 104 to the container 110 will only have a small component in the transport direction or opposite to the transport direction compared to the force component that acts perpendicularly to the transport direction and that pushes the container onto the second transport track 122. The diverting surface in the embodiment displayed in FIG. 1 is even and formed as one piece. However, the diverting segments can also comprise other diverting surfaces, which are for example curved, to adapt to the external contour of a container. Also, they can be formed by multiple pieces. In any case, at least the part of the diverting surface 151 that comes in direct physical contact with the container should be arranged in parallel and/or nearly in parallel (possibly confining a small angle with the transport track) to the transport direction of the containers. If the diverting surface 151 is to be formed in a completely even way, the diverting surface can be provided in a way as to be not only parallel to the transport direction of the containers but parallel to the plane that is defined on one hand by the transport direction and on the other hand by the direction that is perpendicular to the transport path. Alternatively, it can also be provided that the diverting surface of the diverting segment confines a small angle <20° with the transport direction of the containers. Thereby, provision shall be made for the diverting surface to be arranged in a way that it faces away from the transport direction in the transport direction. This enables a partial compensation of the friction force that is due to the friction of the container on the diverting surface and that works contrarily to the transport direction of the containers because the container is impacted by a force in the transport direction due to the slant position of the diverting surface (the container is "pushed forward" in a sense). Therefore, undesired changes in the movement profile of the container, in particular undesired delays that could lead to tipping over of the container or to collisions with other containers, can be avoided.

The diverting segments are driven by engines provided for this purpose. As it may be important in this context that each diverting segment can be moved with a high degree of accuracy, electric engines and here in particular valve drives or actuators are preferred as they enable an accurate adjustment of the movement of the diverting segments 150. The respective engine can be provided either in the frame 101 or separately. As a matter of preference, the diverting segments 150 are all driven by independent engines that are associated with the diverting segments. A respectively provided control unit that can activate the engines and hence control the movement of the diverting segments is then formed in a way that it can activate each of the engines separately. For this purpose, appropriate, preferably bidirectional, data connections are to be provided between the engines and the control unit.

Further, it can be advantageous if the diverting surfaces 151 of the diverting segments 150 have a coating whose friction coefficient is as low as possible. This friction coefficient is preferably lower than the friction coefficient of the transport path. Particularly preferably it is significantly lower, for example only a tenth as high as the friction coefficient of the transport path 120. Therefore, it is achieved that only a low angular momentum will impact on the container through the contact of the container wall of the container 110 for example with the diverting segment 103 on the diverting surface because the friction force that acts contrarily to the movement direction and that is caused in addition through the contact with the diverting segment and that depends on the transport speed of the containers 110 is kept as low as possible. This allows for the use of the diverting device also in case of very high transport speeds of the containers up to for example three or four meters per second. Preferred coatings are for example Teflon or very smooth metallic surfaces.

As can be seen in FIG. 1, precisely the diverting segment 104 moves the container 110 to the right. The diverting segments 102 and 103, that have previously moved the container 110, can be retracted (to the left) in order to make room for the container 11 that should not be diverted in this case.

Figure 2A:
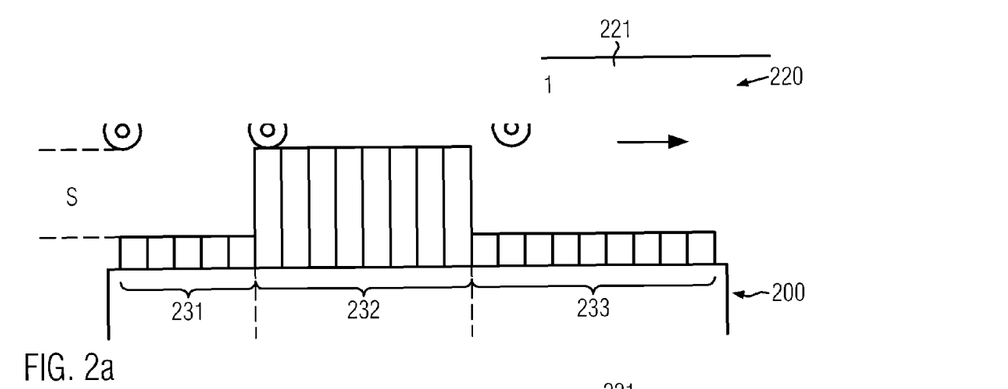
FIG. 2a is a top, semi-schematic view of a diverting device performing a diverting process according to an embodiment of the present disclosure, just prior to diversion of a container.
Figure 2B:
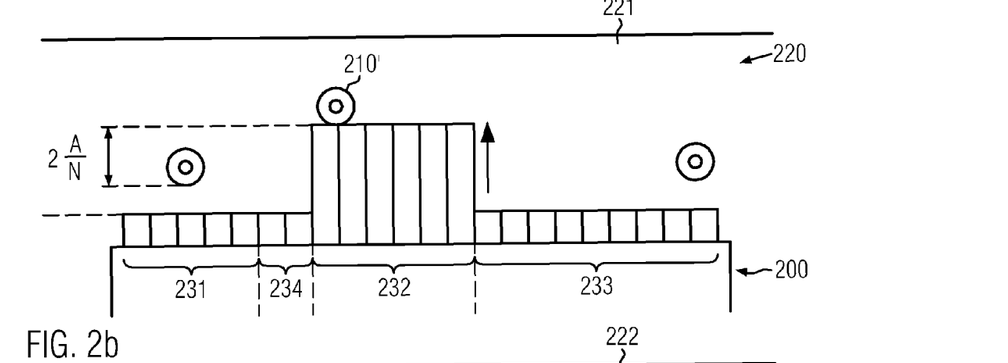
FIG. 2b is a top, semi-schematic view of the diverting process and device of FIG. 2a, illustrating diversion of a container in a diverting path that is perpendicular to its transport path, effected by diverting segments.
Figure 2C:
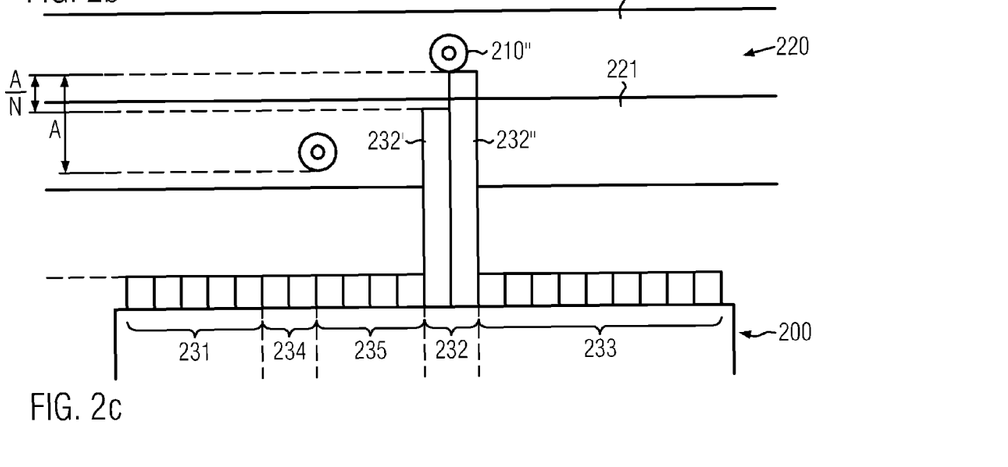
FIG. 2c is a top, semi-schematic view of the diverting process and device of FIGS. 2a and 2b, illustrating further diversion of the container in the direction perpendicular to its transport path, effected by at least one diverting segment.

FIGS. 2a, 2b, and 2c illustrate a diverting device and process in which a container 210 should eventually be diverted out of the original transport path 221 (as shown in FIG. 2c) onto a further transport path 222 of the transporter 220.

FIG. 2a displays three successive containers that pass the diverting device 200. Thereby, the container 210 should be diverted, but not the containers 211 and 212. To make the control of the diverting device as effective as possible, it can be provided that sensors register the exact position of the containers prior to the entry of the containers into the diverting device or in the area of the transport path next to which the diverting device is to be installed, and that the control unit also determines the position of the containers in relation to each other as a function of the signals that have been received this way. Therefore, it can be ensured that no diverting segments will be extended mistakenly while a consecutive container is already entering the diverting device and could therefore collide accidentally with extended diverting segments.

In principle, as many diverting segments as possible are preferably used for diverting. According to FIG. 2a, all diverting segments 232 that are disposed between the container 210 to be diverted and the container 211 ahead of it are at first extended by a path s. This path s is thereby preferably equivalent to the distance of the container 210 to be diverted from the diverting device and/or the end of the diverting segments to be installed in the diverting device 200. Also, the extension path s can be intended to be slightly shorter than the distance of the diverting segments in a retracted state from the container 210 to be diverted in order to prevent the container 210 from bumping during entry into the area 232 with extended diverting segments. The remaining diverting segments of the diverting device 200, in particular the diverting segments 233 that are located in the area of the diverting device 200 that is passed by the forward-moving container 211 and the diverting segments 231 that are located in the area of the diverting device 200 that has already been passed by the container to be diverted, are preferably not extended. Therefore, collisions can be avoided.

While the container 210 continues to move along the transport path 221, the diverting segments 232 are moved perpendicularly to the transport direction as displayed schematically by the arrow in FIG. 2b. Thereby, only the diverting segments that are located ahead of the container 210' in the transport direction of this container 210' are moved further in the indicated arrow direction. The diverting segments 234 that the container 210' has already passed in relation to its position in FIG. 2a are, just as the remaining diverting segments 233 and 231, retracted back to the rest position in order to avoid collisions with following containers. The diverting segments 232 are preferably moved in a way that successive diverting of the container 210' over a part of the overall diverting path A is achieved through each diverting segment. In this process, it is preferred when the part a of the overall diverting path A, by which each diverting segment displaces a container 210' to be diverted as displayed in FIG. 2b perpendicularly to the transport direction, is equal for each diverting segment, whereby this is not compulsory and depends in principle on the intended movement profile of every single diverting segment and the movement profile to be achieved of the container to be diverted during the diverting process. Therefore, this part a of the overall diverting path A can be given through $a=A/N$, where N is the overall number of the diverting segments to be provided in the diverting device. However, this will only be useful if all diverting segments of the diverting device are used for the diverting process. If this is not the case and if only a specific part of the diverting segments of the diverting device is used, N will not correspond to the overall number of diverting segments of the diverting device 200 but only to the number of the diverting segments that are to be provided for diverting of the specific container 210'. According to FIG. 2b, the container 210' has, compared to FIG. 2a, passed the retracted diverting segments 234 displayed in FIG. 2b. Compared to the situation displayed in FIG. 2a, the container 210' is therefore perpendicular to the transport direction of the container by the path 2a and/or 2A/N further away from its original place.

In FIG. 2c, the container 210' has been brought into the respective position onto the second conveyor path 222 through further successive diverting processes of the diverting segments 235. The diverting segments 232 that have still been used for diverting are thereby extended at different levels. The penultimate diverting segment 232' in the transport direction is thereby extended less far by the part a than the diverting segment 232" that is still in contact with the container 210". As described further above, the first diverting segment 232' has displaced the container by a path a compared to the previous diverting segment. The diverting segment 232", in turn, has further diverted the container perpendicularly to the transport direction by the path a so that the distance of the container 210", perpendicular to the center of the original transport direction from the diverting segment 232' to the diverting segment 232", has increased by the path a.

It should be mentioned that this diverting process is only displayed in an exemplary way. Even though each diverting segment in this embodiment is displaced perpendicularly to the transport path by the path a further than the preceding diverting segment, it can also be intended to interconnect multiple diverting segments, for example two, in order to produce an appropriate displacement by the path section a. In this case, more than two diverting segments are necessary to displace the container by the overall diverting path A Likewise, the partial sections by which the respective diverting segments divert a container can vary. For example, these partial sections can be small at the beginning and end of the diverting process, for example amount to only 0.2-0.5 cm, whereas they can be larger in between and amount for example to 0.5-1 cm. To avoid collisions of a container to be diverted with areas of the diverting segments that do not correspond to the diverting surface as described in FIG. 1, the individual diverting elements should be installed in a way that they will only be moved if the container to be diverted is located in the area of the respective diverting surface of the diverting segment. This way, the impact of force is ensured to take place in the radial direction, seen from the references system of a container to be diverted, which contributes to the reduction of emerging forces in or contrary to the transport direction of the containers.

The described initial diverting of the diverting segments by the path s in order to lead them as closely as possible to the container 210 to be diverted as displayed in FIG. 2a is therefore not absolutely necessary. It can also be provided that a diverting process of the container can already take place without prior displacement by the path s and/or that this path can be equal to zero. Based on the initial displacement by the path s, regardless of its value, the diverting segments can be moved perpendicularly to the transport path by the partial sections a to perform the diverting process as described above.

To be able to divert a container by the diverting path A, it is therefore necessary that each of the N diverting segments can be displaced by a defined path. Hence, it is a necessary condition that the n-th diverting segment can be extended by the path $L=a+a(n-1)$. For the first diverting segment ($n=1$), it can consequently be concluded that it must be possible to displace this segment by at least the part $a=A/N$ of the diverting path. The last diverting segment, in turn, has to be extendible by the overall diverting path A. Even if it may be useful to already provide for the diverting segments accordingly and also to design the engines in a way that the diverting segments can be extended by the respective paths, it can be advantageous if each diverting segment is extendible by the intended maximum diverting path A. This can be implemented effectively by means of ensuring that all diverting segments to be provided in the diverting device 200 are structurally identical. This means that they all have the same length and identical engines.

If more than one diverting path 222 is provided for, for example a distribution of containers on four or five transport paths by the diverting device 200, each diverting segment preferably has to be extendible by the overall possible diverting path so that each diverting segment can in principle divert a container also onto the transport path that is furthest away. Alternatively, it can also be provided for a systematic use of the inertia of a container diverted by the diverting segments in order to ensure that it will continue to move by a path q that is perpendicular to the transport direction, even after the end of the diverting process. In such a case, the diverting segments do not necessarily have to be able to divert a container by the overall diverting path onto a transport path that is further away, but it can be sufficient if the diverting segments, as a function of the transport path intended for the container (first adjacent one, second adjacent one, etc.), transmit a specific momentum p to the container but only divert the container themselves by a defined part of the overall diverting path. Then, the momentum p can be chosen in a way that it is sufficient to compensate the friction force that works contrary to the movement that is perpendicular to the transport path and to trigger a movement of the recipient over the remaining part of the overall diverting path (overall diverting path minus the part effected by the diverting segments). As the containers of the same type nearly have an identical weight and as the conditions under which the containers move along the transport path are nearly identical for every container of the same type, also this embodiment of the diverting mechanism is very accurate but has a shorter time of use of the individual diverting segments in relation to an embodiment in which the container is moved completely over the overall diverting path by the diverting segments.

FIGS. 2a through 2c demonstrate that it will be advantageous if the diverting surfaces of two directly adjacent diverting segments align with each other (i.e. if the two diverting segments are deflected or extended equally far) when the container is moving straight from the area of one diverting segment into the area of the adjacent diverting segment. Thereby, the diverting surface composed of the two diverting surfaces presents itself for the container without levels or cracks. This alignment of two adjacent diverting segments preferably has to be maintained during the movement of the two diverting segments for diverting the container. Preferably, the alignment (in particular during movement of the segments for diverting) is to be provided for all pairs of directly adjacent diverting surfaces that take part in the diverting process.

Should the diverting segment 232" in FIG. 2c not have diverted the container far enough, also one or multiple diverting segments of the group 233 could be extended as soon as the container 211 has left the area ahead of the respective diverting segments 233. Therefore, a part of deflected diverting segments that moves along with the container can emerge.

FIG. 3 shows movement and speed profiles of the diverting segments that belong to the diverting processes according to two embodiments. The movement and speed profiles shown in FIGS. 3a and 3b relate to the diverting segment that is moved around the overall diverting path A. It is clear that, for the remaining diverting segments that are only displaced by a part of the overall diverting path A in order to divert a specific container, the maximum movement amplitude, i.e. the maximum deflection or the maximum extension of the diverting segment has to be replaced by the value L as described above.

Figure 3A:
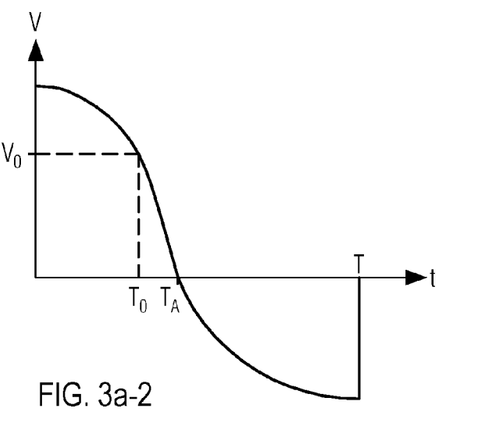
Figure 3A:
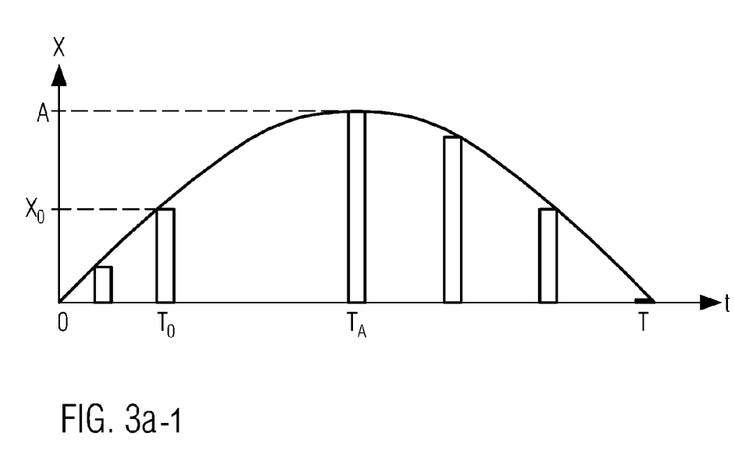
Figure 3B:
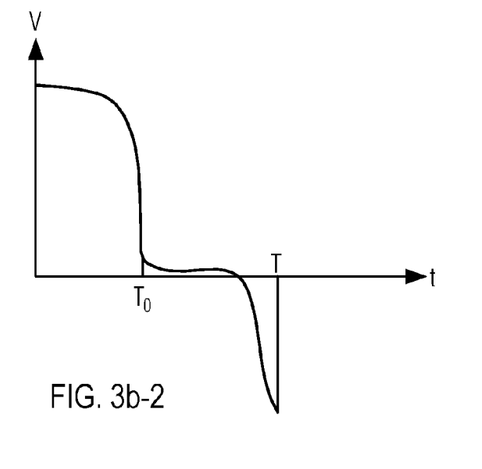
Figure 3B:
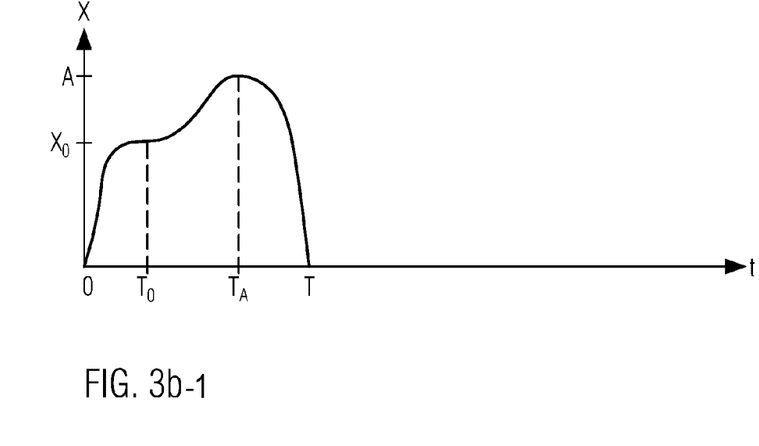

FIG. 3a-1 and FIG. 3a-2 are, respectively, distance over-time and velocity over time plots that reflect shows an embodiment in which the diverting segment performs a movement that is perpendicular to the transport direction in accordance with the function $x=l \cdot \sin(ct)$. For the sake of simplicity, it is assumed that the diverting element starts from its respective resting position at the value 0 and reaches the maximal value A so that we obtain I=A. If an initial displacement by the path s described in FIG. 2a is to be provided, the movement profile can of course be adapted accordingly. The movement of the diverting segment from its retracted position into the extended position by the path s can in principle take place in any way because no force transmission to a container takes place here. In such a case, the movement of the diverting segment towards the container is preferred to take place with a high speed.

According to FIGS. 3a-1 and 3a-2, the movement of the diverting segment perpendicular to the transport direction follows a sine function; at first it rises steeply but then it levels off slowly until the deflection at the time $T_A$ reaches its maximum value and the container will have been diverted to the target position. The takeover of the container by the diverting segment takes place at the time $T_0$ at the deflection $x_0$ of the diverting segment. To keep the force that impacts on the container in the process as low as possible, the point $x_0$ on the curve displayed here is only insignificantly different from the target point of the deflection so that, according to the displayed speed profile, the speed at which the diverting segment moves towards the container to be diverted is as low as possible. However, this can also be achieved with other movement profiles that establish a functional link, which is in principal a random link, between the movement of the diverting segment and the time. Here, also a plurality of parameters (speed, acceleration, maximum diverting movement of each individual diverting segment) can be used to adapt such a movement profile to specific requirements. After diverting the container, the diverting segment can move back to its initial position by following the descending part of the sine curve in FIG. 3a-2 after passing the time $T_A$. At the time T, the diverting segment will be back in the retracted state. As the time during which a container to be diverted can even be in contact with a diverting segment is limited, the speed at which the diverting segment moves has to be so high that during the time, during which the contact with the container to be diverted exists, diverting of the container by the respective path $A-x_0$ can take place. For this purpose, the control unit can adapt free parameters such as the maximum deflection of the diverting segment and the speed profile accordingly. It is preferred that the parameters of the movement profile of the diverting segment or the diverting segments can also be modified as a function for example of the weight of the containers in order to be able to adjust impacting forces to filled or unfilled containers.

FIGS. 3b-1 and 3b-2 reflect shows a further embodiment of a movement profile of one of the diverting segments. Also here, it is assumed that it is the diverting segment that displaces the container by the last section $A-x_0$ so that the container has passed the complete diverting path A. In this embodiment, the movement profile x(t) of the diverting segment perpendicular to the transport path does not correspond to any sine function but to a fundamentally random functional connection. In this embodiment, the diverting segment will be moved very fast and perpendicularly to the transport direction (compared to the embodiment according to FIG. 3a) up to its point of contact $x_0$ at the time $T_0$ with the container to be diverted. As the diverting segment in this area of its movement profile is not yet in contact with the container to be diverted, there will not be any disadvantages due to this as no force transmission to the container to be diverted takes place. In the area around the time $T_0$, in which the contact between the container to be diverted and the diverting segment is established by means of the diverting surface on the diverting segment, the speed, as shown in the accompanying speed profile in FIG. 3, is reduced almost to the value 0 and/or is adapted to the movement speed of the diverting segment that is directly adjacent upstream in the transport direction or that is identical to this speed. From this point in time $T_0$, the container is pushed by the diverting segment up to the time $T_A$ as far as that it overcomes the difference $A-x_0$ perpendicular to the transport path. During this process, the speed of the diverting segment can essentially be kept constant or even increase but will approach zero as soon as the diverting segment with the container to be diverted reaches the final position. It can also be provided that the speed continues to increase in this part of the diverting process in order to divert the container as fast as possible. Afterwards, the diverting segment can be brought back to its starting position, preferably with a very high speed (in order to make room for following containers that should not be diverted, or to take over the next container that is to be diverted at the position $x_0$). The movement profile according to FIG. 3b offers the advantage that, due to the high speed during extension in the direction of the first contact point with the container $x_0$ to be diverted and after the end of the diverting process back to the starting position, the diverting segments only remain extended for a short time, which enables diverting of containers to be diverted, both at high transport speeds as well as in case of a relatively short distance of the containers to each other in the transport track. Relevant movement profiles as displayed in FIGS. 3a-1, 3a-2, 3b-1, and 3b-2 can therefore be preferred for the diverting segments if the control electronics and the engines are suitable to enable a respective movement.

The movement profiles displayed in FIGS. 3a-1, 3a-2, 3b-1 and 3b-2 can preferably be achieved through successive diverting by means of the individual diverting segments. Here, its is though particular preferred that not all diverting segments divert the container to be diverted by the same part a of the diverting path. To achieve the highest possible flexibility in the diverting process, it can be provided that the individual path sections by which a respective diverting segment diverts a container differ by pairs. It can also be provided that only the path sections of some diverting segments differ from the remaining ones. In one embodiment, it is provided that a container to be diverted is diverted initially only to a minor extent by one or multiple diverting segments. For example, the diverting segments that lead in the transport direction (the first 2, the first 4 or the first 10)

can each divert the container by a path k. The path k does not have to be equal for all diverting segments; in particular, it can be slightly increased from each diverting segment to the next. It can for example be provided that only the last of these leading diverting segments diverts the container by the path section a as described above. The remaining ones by a smaller path section. The diverting segments that follow these leading diverting segments can then divert the container to be diverted by path sections p. The path sections p can increase from diverting segment to diverting segment in the transport direction as well. Furthermore, all of the path sections p can be larger than a. It can also be provided that one or some of the last diverting segments (the last one, the last two or the last 5 in the transport direction) only displace the container by path sections q that are slightly smaller than p in order to reduce the speed at which the container moves at the end of the diverting movement and to avoid tipping over in this process.

It is intended that containers are also diverted completely from the conveyors by means of the diverting device (for example into containers for rejects arranged next to the conveyors) while it can also be provided that the speed at which the diverting segments move towards the container increases more and more so that the container also has a sufficiently high momentum in a perpendicular direction to the transport path even after passing the last diverting segment in order to slide or to fly (transversally beyond a conveyor) into a container intended for this purpose and/or to be distributed onto a conveyor belt or the like that is positioned in parallel to the transport path.

The movement profiles displayed here are only two possible examples for specific embodiments. Other, clearly more complicated movement patterns are possible as well. Likewise, it can be provided that a diverting segment is moved towards the container to be diverted with a constant speed and diverted with the same speed up to the end of the diverting path. The diverting segment can then be stopped in a relatively abrupt way, i.e. nearly instantaneously, and moved in the opposite direction back to the diverting device.

Similarly, it is possible to equip diverting segments with a double function, for example to implement also a pusher function according to DE 19516403 besides the transfer/diverting function. This way, it can be achieved that a diverting segment can trigger a relatively slow but very accurate diverting of a container onto a further transport path but also push containers from the transport path for example into a provided container at the same time and/or in another processing step. As it needs to be ensured for this process that the pushed container will not knock another container over, this pushing or shoving can take place with a significantly higher speed than a normal diverting process. By means of ensuring through control technology that the movement of the diverting segments is controlled according to defined parameters, this motion control can be implemented very easily, in particular if direct drives are used.

Figure 4:
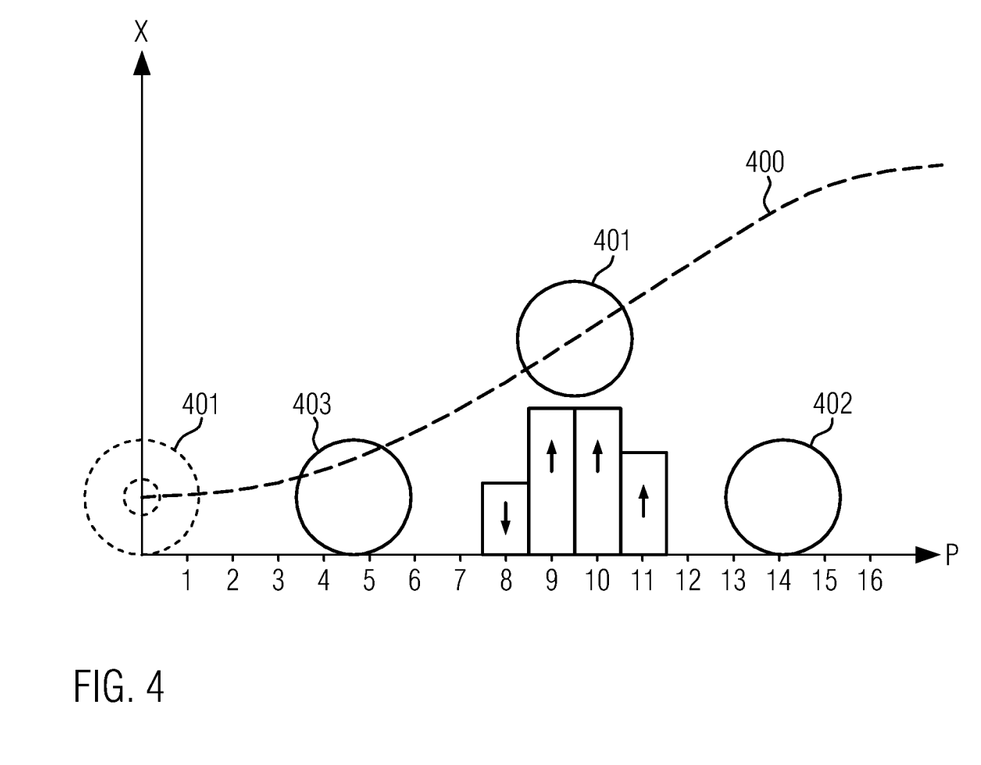
FIG. 4 Display of a movement trajectory of a container.

FIG. 4 shows a possible trajectory 400 of a container 401 that is to be diverted. The transport direction is to the right. The container 401 is preceded by a container 402 and followed by a container 403, which should both not be diverted. The trajectory starts at the position 401' indicated by the dotted line. Starting there, the container 401 was deflected consecutively by the diverting segments with the position numbers P from 1 to 9 in the direction x. The diverting segment 8 is just being retracted in order to make room for the container 403. The two segments number 9 and 10 are aligned and moved outward synchronously and with the same speed in order to divert the container 401 and to ensure a continuous transition of the container 401 from the diverting segment number 9 to the diverting segment number 10. The diverting segment 11 is just being extended in order to align with the outward moving diverting segment number 10 shortly. Through the interplay of the diverting segments 1 to 16 (or also of fewer segments or, if provided for, more segments), a curvilinear trajectory 400 (s-curvilinear) of the container 401 is achieved even though the diverting surfaces of the diverting segments are aligned in parallel to the transport direction. The diverting segments number 8 to 11 are in a zone of extended diverting segments that moves along with the container. The remaining diverting segments (ahead and/or behind in the transport direction) are retracted.

The diverting segments cause a growing path of the diverting process with an increasing number. This means that the diverting segment 2 causes a greater movement in the direction x than the diverting segment 1 and the diverting segment number 3 more than the diverting segment number 2 and so on. Possibly, the movement path of the container that is caused by the last diverting segment(s) (e.g. number 16 or number 15 and 16) is smaller than the path that the container is moved by an upstream diverting segment (e.g.) the diverting segment 14 in order to trigger a deceleration of the container. After leaving the last diverting segment used (e.g. number 16), the container can still continue to move independently in the direction x due to its inertia but with an increasingly slower speed. The further movement of the container to be diverted transversally to the transport direction due to its own inertia can also be used as an indicator to show in the first place how many diverting segments have to be used for a defined container or container type (large, small, filled, unfilled). If the container moves due to its inertia in a way that it already leaves the diverting curve, which is described by the diverting segments during normal operation, prior to arriving at the last diverting segment or the diverting segments in the rear, i.e. if it has already moved further perpendicularly to the transport direction than intended by the diverting process by means of the diverting segments at this time, it can be provided that this or these diverting segment(s) will not be used. Therefore, energy can be saved as the diverting of the container can also take place without these diverting segments. However, it can also be provided that the effect of the inertia of the container is taken into account for the determination of the movement profile of each diverting segment in order to ensure that a container to be diverted will at least be supported during the overall diverting process by the diverting segments and hence be prevented from tipping over, even if an additional force transmission to the container to be diverted is omitted in the last diverting segments in the transport direction. In this case, these diverting segments will not have an active diverting function in contrast to the preceding diverting segments, i.e. they will not push the containers perpendicularly to the transport direction over the transport path but they will only touch the container or will only move with it perpendicularly to the transport path at a distance of a few millimeters, preferably 2 mm, particularly preferably less than 1 mm, so that it will be prevented from tipping over.

What is claimed is:
1. A diverting device for diverting containers, from a transport path, comprising:
    at least two diverting segments, disposed next to the transport path, which are formed movably in a direction perpendicular to the central axis of the transport path and not movable in a direction parallel to the central axis, the diverting segments adapted to divert a container from the transport path, each of the diverting segments including
a diverting surface that is parallel to the transport direction of the containers in the transport path and is selectively brought into contact with a container to be diverted, the diverting device including N diverting segments and further comprising a control unit that effects deflection of the diverting segments in the transport direction of a container to be deflected successively by a part of the overall diverting path A so that a container can be diverted through successive diverting, wherein the part of the diverting path A is provided through $$a = \frac{A}{N}$$

and wherein the n-th (n≤N) diverting segment can be extended by the path l=a+a(n−1), or wherein the control unit selectively effects deflection of the diverting segments such that each diverting segment can deflect a container by a path section that differs at least from a path section of another of the diverting segments, wherein a sum of the path sections of all the diverting segments is equal to the overall diverting path A.

2. The diverting device according to claim 1, each diverting segment being controlled separately.

3. The diverting device according to claim 1, in controlled communication with a control unit that controls a movement profile of each of the diverting segments, whereby a diverting path of a container can be adjusted perpendicular to the transport path.

4. The diverting device according to claim 1, the diverting device including at least 5 diverting segments.

5. The diverting device according to claim 1, the diverting surface having a lower friction coefficient than the transport path.

6. Diverting device according to claim 4, wherein a first number of diverting segments is disposed in the transport direction ahead of a second number of diverting segments, and wherein the first number of diverting segments can each divert a container by a path smaller than a and wherein the second number of diverting segments can each divert a container by the path greater than a, where $$a = \frac{A}{N},$$

with A as the overall length of the diverting path and N the number of the diverting segments.

7. A method for diverting of containers from a transport path by means of at least two flexible diverting segments that are disposed next to the transport path and formed movably in a direction perpendicular to the central axis of the transport path and not movably in a direction parallel to the central axis, comprising:
moving the diverting segments perpendicularly to the transport path to divert a container perpendicularly to the transport path, the diverting segments contacting the container to be diverted during diverting with a diverting surface, which is located in parallel to the transport direction of the containers in the transport path, thereby diverting the container, wherein N diverting segments are controlled by a control unit in such a way that the diverting segments are deflected successively in the transport direction of a container to be diverted by a part of the overall diverting path A, the part of the diverting path A being given by $$a = \frac{A}{N}$$

moving the n-th diverting segment in the transport direction by the path l=a+a(n−1), wherein a container is diverted successively by parts of $$a = \frac{A}{N}$$

of the diverting path until the container will have been diverted by the overall diverting path A, or wherein the control unit selectively effects deflection of the diverting segments such that each diverting segment deflects a container by a path section that differs at least from a path section of another of the diverting segments, wherein a sum of the path sections of all the diverting segments is equal to the overall diverting path A.

8. The method according to claim 7, and separately controlling the movement of each of the diverting segments.

9. The method according to claim 7, and determining a diverting path of a container to be diverted that is perpendicular to the transport path through control of a movement profile of the diverting segments.

10. The method according to claim 7, and in moving the diverting segments, the movement of the diverting segments perpendicular to the transport path is described by a function $x = l \cdot \sin(ct)$ or any other function $x_{a,b,\ldots}(t)$, wherein t is the time and a, b, c are random real numbers greater than zero.

11. The method according to claim 7, and in moving each of the diverting segments, the speed at which the diverting segment is moved in the direction of the container to be diverted and away from this container is higher than the speed at which the diverting segment moves while the diverting segment with the diverting surface is in contact with the container to be diverted.

12. The method according to claim 7, and controlling N diverting segments by a control unit in a way that the diverting segments are deflected successively in the transport direction of a container to be diverted by a part of an overall diverting path A, each diverting segment diverting the container for a path section that differs from at least one further diverting segment, wherein a sum of the path sections is equal to the overall diverting path A.

13. The diverting device according to claim 1, wherein the containers to be diverted are bottles.

14. The method according to claim 7, wherein in moving the diverting segments perpendicularly to the transport path to divert a container perpendicularly to the transport path, the container to be diverted is a bottle.

* * * * *